United States Patent [19]
Jung et al.

[11] Patent Number: 5,606,229
[45] Date of Patent: Feb. 25, 1997

[54] HORIZONTAL DEFLECTION AMPLIFYING APPARATUS

[75] Inventors: Kwang-yung Jung, Suwon-city; Jae-hoon Jeong, Taejeon-city, both of Rep. of Korea

[73] Assignee: Samsung Display Devices Co., Ltd., Kyungki-do, Rep. of Korea

[21] Appl. No.: 645,072

[22] Filed: May 13, 1996

[30]     Foreign Application Priority Data

May 15, 1995  [KR]   Rep. of Korea ................... 95-11991

[51] Int. Cl.$^6$ ................ H01J 29/70; H01J 29/76
[52] U.S. Cl. .................... 315/408; 315/411; 315/409
[58] Field of Search ................................ 315/411, 408, 315/409

[56]              References Cited

U.S. PATENT DOCUMENTS 5,283,505  2/1994  Bando .................... 315/411
5,517,090  5/1996  Bando .................... 315/370

Primary Examiner—Theodore M. Blum
Attorney, Agent, or Firm—Leydig, Voit & Mayer

[57]            ABSTRACT

A horizontal deflection amplifying apparatus for use in an automatic main power supply such as that for a cathode ray tube is provided. The apparatus uses a microprocessor for the connection of capacitors to a horizontal deflection coil (yoke coil) by controlling the switching operation of relay switches. To prevent the drive transistor of the deflection coil driver from being destroyed or the horizontal deflection coil from being damaged due to excess current, the capacitors are connected or disconnected while the power supply voltage is off (i.e., at a 0V state) and the supply voltage is then re-applied. Thus, the horizontal deflection amplifying apparatus can be safely driven.

4 Claims, 8 Drawing Sheets

HORIZONTAL DEFLECTION AMPLIFYING APPARATUS

BACKGROUND OF THE INVENTION

The present invention relates to a horizontal deflection amplifying apparatus, which is used for an automatic main power supply such as that for a cathode ray tube, a color picture tube and a high definition television.

The horizontal deflection of a general cathode ray tube employs a horizontal deflection amplifying apparatus, which requires a power supply voltage of about 80V. This supply voltage is provided by a switching power supply circuit or a linear power supply circuit. Although the switching circuit is highly efficient, switching noise associated with the switching circuit deteriorates picture quality by adversely influencing the deflection current. Hence, the linear circuit is the more widely used.

Referring to FIG. 1, a conventional horizontal deflection amplifying apparatus for a linear power supply circuit is comprised of a power supply 10, a deflection coil driver 20, a capacitor controller 30, and an autotransformer 40. The power supply 10 supplies constant (DC) voltages to the deflection coil driver 20 and to the capacitor controller 30 so that the autotransformer 40 can provide the necessary drive voltage to drive a horizontal deflection coil (see FIG. 3). The autotransformer 40 generates the deflection voltage appropriate for the horizontal deflection coil (yoke coil) of a television set, by a tap manually selected during fabrication according to the screen size of the television. The power supply 10 is shown in FIG. 2 while the deflection coil driver 20, the capacitor controller 30 and the autotransformer 40 are shown in FIG. 3.

Referring to FIG. 2, the collector-to-emitter voltage (approximately 5 V ) of a transistor $Q_1$ is predetermined to reduce the inherent power loss of the power supply 10 and a transistor $Q_2$ is provided to shut down the power supply circuit by switching off transistor $Q_1$ which prevents electrical damage to the horizontal deflection circuit. To accomplish this, a semiconductor-controlled rectifier (SCR) $Q_3$ is connected to the base of transistor $Q_2$. When the proper trigger is applied to the gate of SCR $Q_3$, the base of transistor $Q_2$ is effectively grounded through the SCR.

Two means are employed for protecting the horizontal deflection circuit. First, when excess current flows through a resistor $R_1$, a transistor $Q_4$ reaches saturation and the gate of SCR $Q_3$ is triggered and operation of the power supply circuit is stopped. Second, when the pulsed collector voltage ($V_{CP}$) of a transistor $Q_5$, i.e., an insulation-gated bipolar transistor (IGBT), of the deflection coil driver 20 of FIG. 3 exceeds approximately 1,000 V, a trigger signal is created and supplied to the gate of SCR $Q_3$ through a comparator 11, thereby stopping operation of the power supply circuit.

Referring to FIG. 3, in the deflection coil driver 20, the ±15 V applied from the power source 10 drives IGBT $Q_5$ according to a horizontal deflection signal $H_{def}$ and a supply voltage drives the deflection coil via a plurality of capacitors $C_1$–$C_{14}$ and the autotransformer 40. That is, if the supply voltage is continually applied to the capacitor controller 30 according to the switching operation of the driven IGBT, the appropriate voltage $V_{CP}$ is generated between the emitter and collector of IGBT. The capacitor controller 30 is comprised of a plurality of capacitors $C_1$–$C_{14}$ and relay switches $K_1$–$K_{12}$ for selecting the capacitors. The autotransformer 40 includes a plurality of taps corresponding to relay switches $K_{13}$–$K_{22}$ which selects the appropriate (screen size) inductance and which generate the proper deflection voltage for a yoke coil 50 of the television set. The autotransformer 40 also includes a plurality of relay switches $K_{19}$–$K_{22}$ which are used for the fine-tuning of the deflection voltage.

In the above horizontal deflection amplifying apparatus, the capacitors are selectively connected so that the desired deflection current is supplied to the yoke coil. During such connection, however, the state of the circuit changes, thereby creating current transients of excessive voltage levels. Accordingly, to prevent such current transients the power source should be turned off just before the capacitors are connected and turned back on immediately thereafter.

SUMMARY OF THE INVENTION

Accordingly, it is the object of the present invention to provide a horizontal deflection amplifying apparatus in which damage due to excessive transient current is prevented when a horizontal deflection coil is connected to the capacitors via switching means.

To accomplish the above object of the present invention, there is provided a horizontal deflection amplifying apparatus comprising: an autotransformer having a plurality of taps; a plurality of capacitors selectively connected to the taps of the autotransformer; a first switching means for selectively connecting the capacitors to the taps of the autotransformer; a deflection coil driver for applying current to the autotransformer through the first switching means; a power supply for supplying constant voltage to the capacitors and to the deflection coil driver, and having the power supply including protective means for interrupting the constant voltage to protect the deflection coil driver; and a control means for controlling the first switching means and supplying a control signal to the protective means to temporarily interrupt the constant voltage before the switching operation of the first switching means.

It is preferable that the first switching means includes first relay switches for selecting the capacitors and second relay switches for selecting the taps of the autotransformer; and that the protective means includes a second switching means comprised of a bipolar transistor, IGBT, FET, SCR or triac for disabling the power supply in response to the control signal of the control means.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
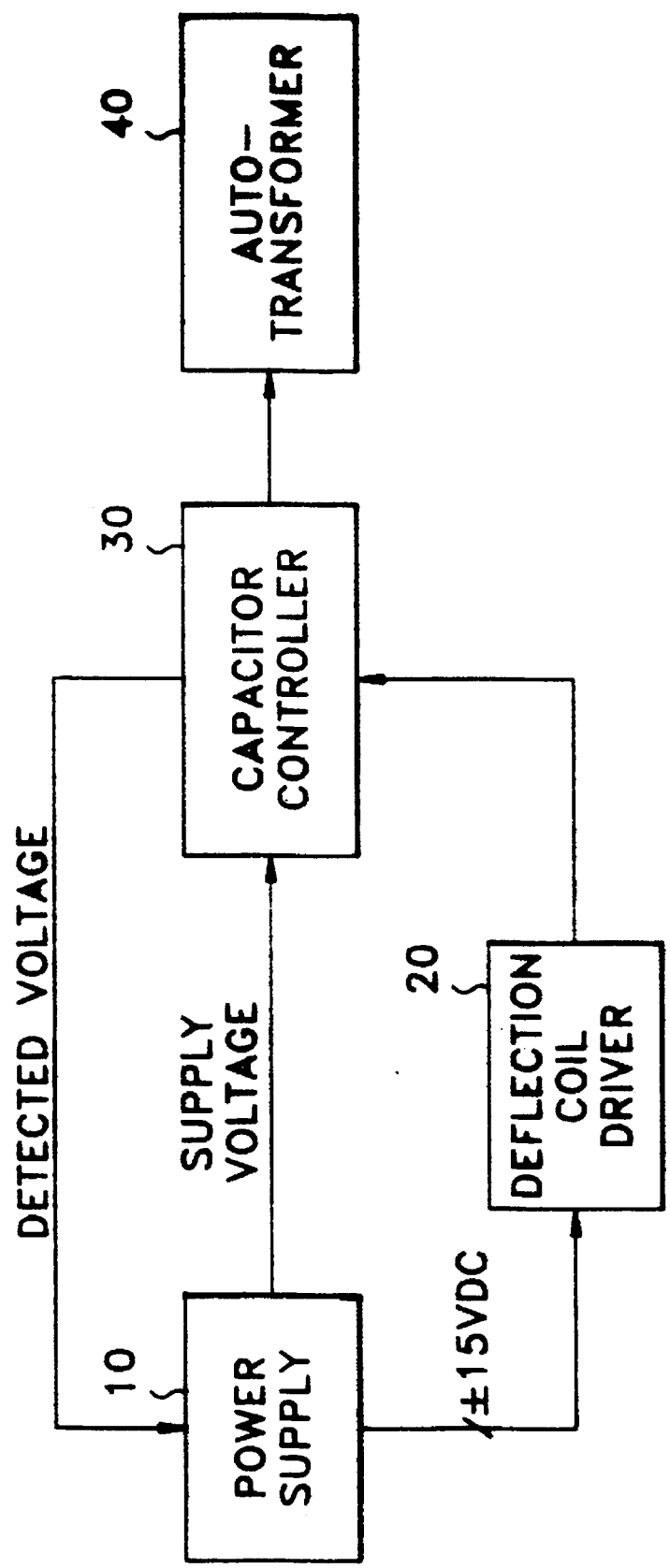
FIG. 1 is a block diagram of a conventional horizontal deflection amplifying apparatus.
Figure 2:
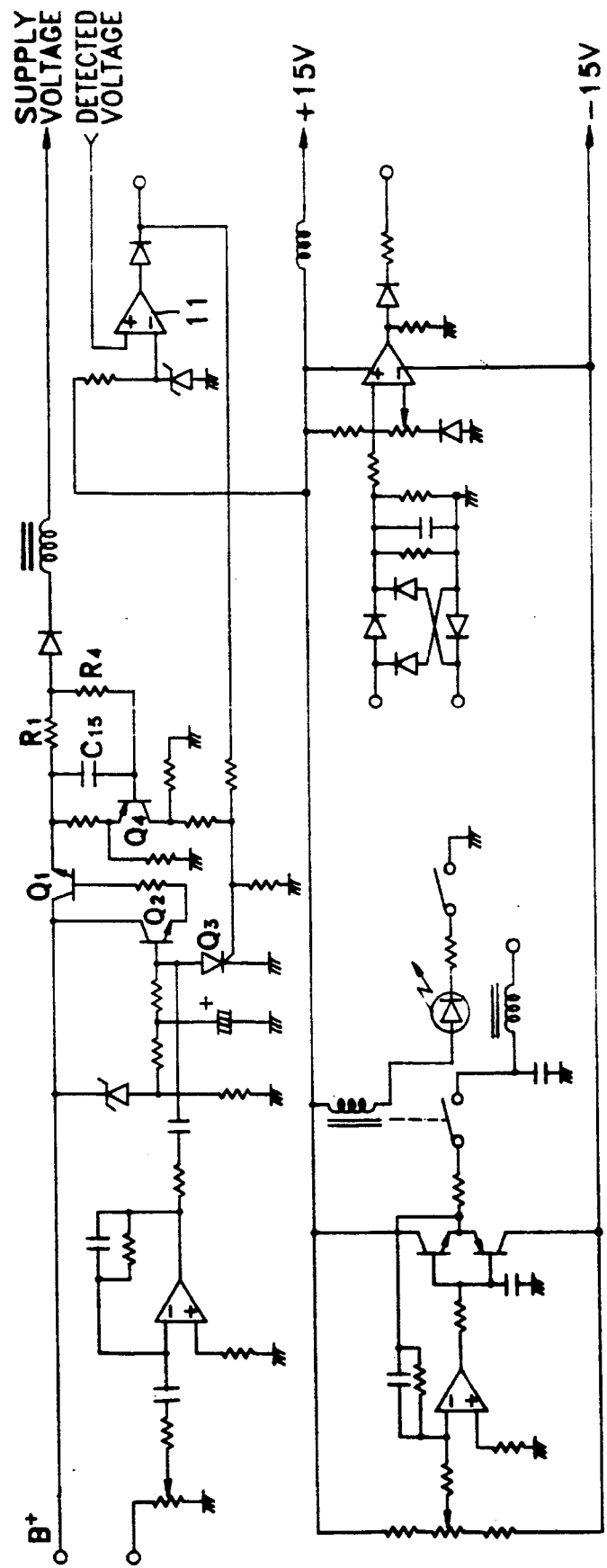
FIG. 2 is a circuit diagram of the power supply of FIG. 1.
Figure 3:
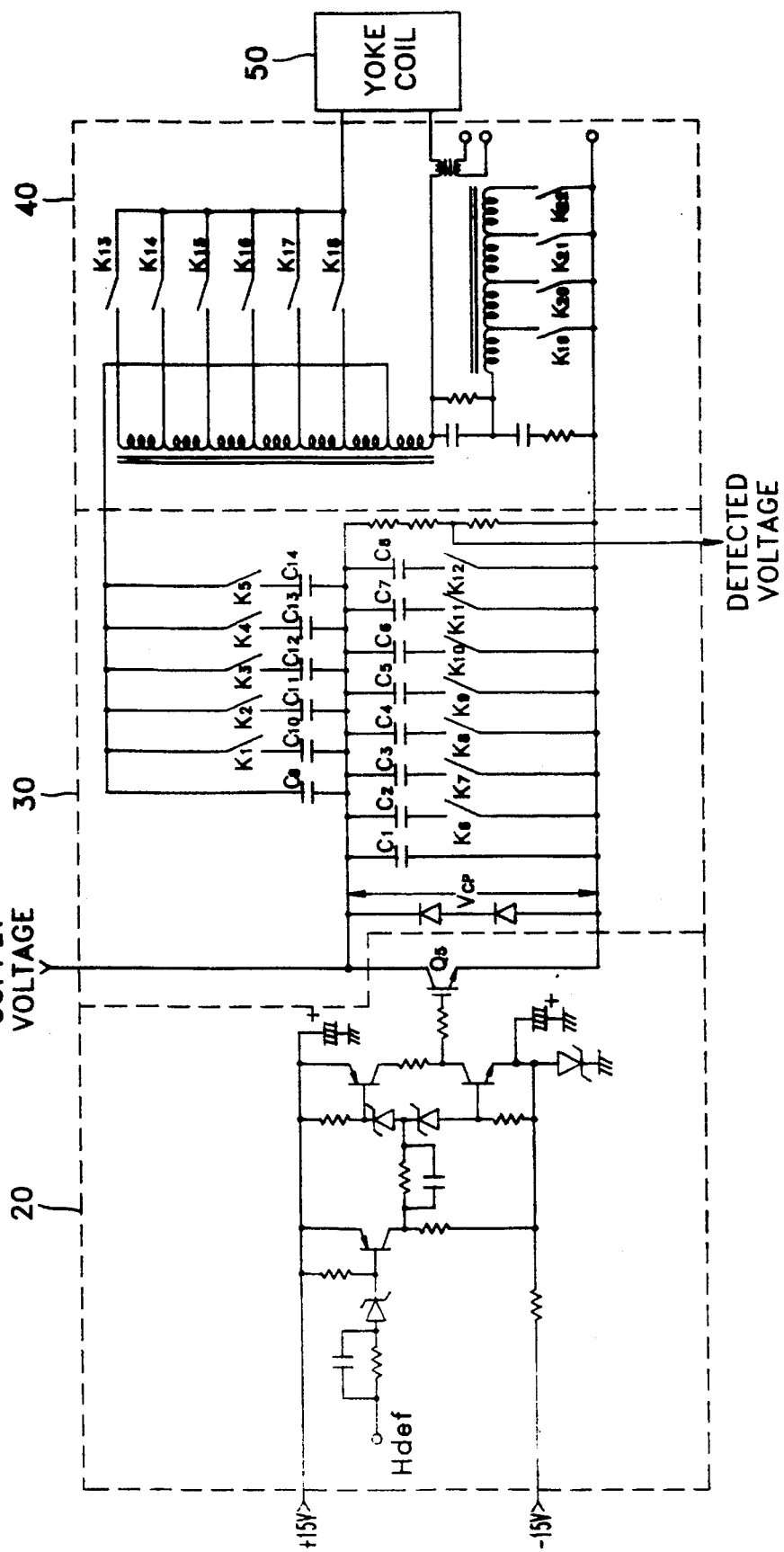
FIG. 3 is a circuit diagram of the deflection coil driver, capacitor controller, and autotransformer of FIG. 1.
Figure 4:
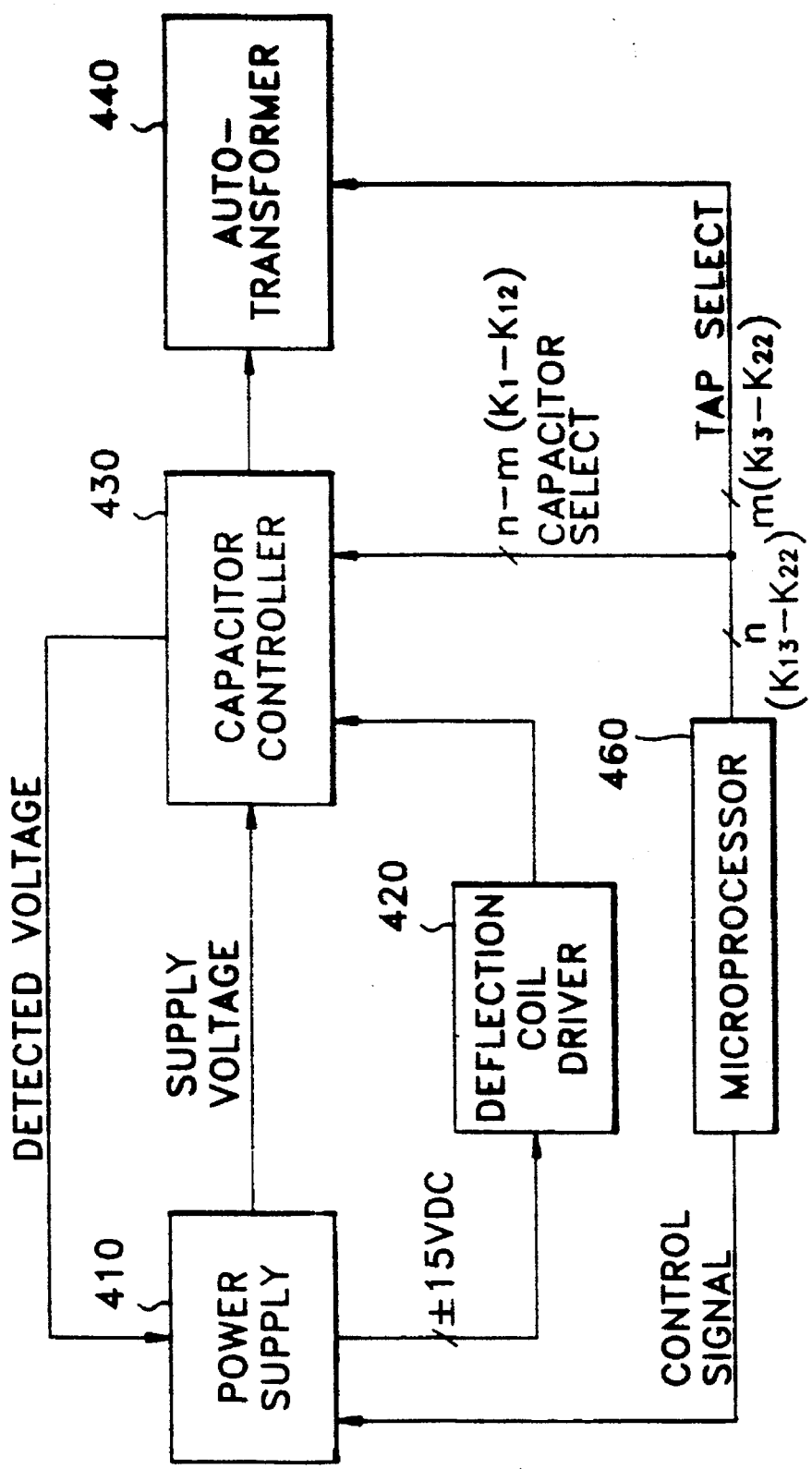
FIG. 4 is a block diagram of a horizontal deflection amplifying apparatus according to the present invention.
Figure 5:
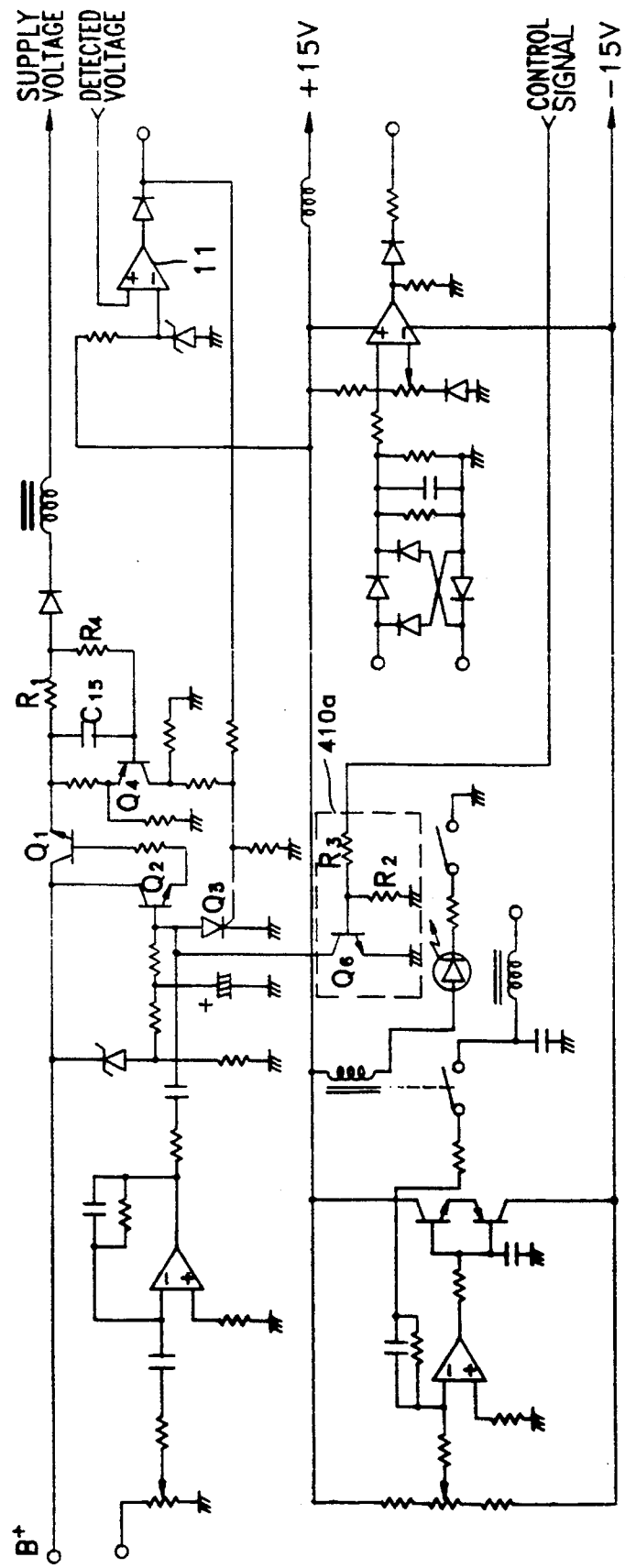
FIG. 5 is a circuit diagram of the power supply of FIG. 4.
Figure 6:
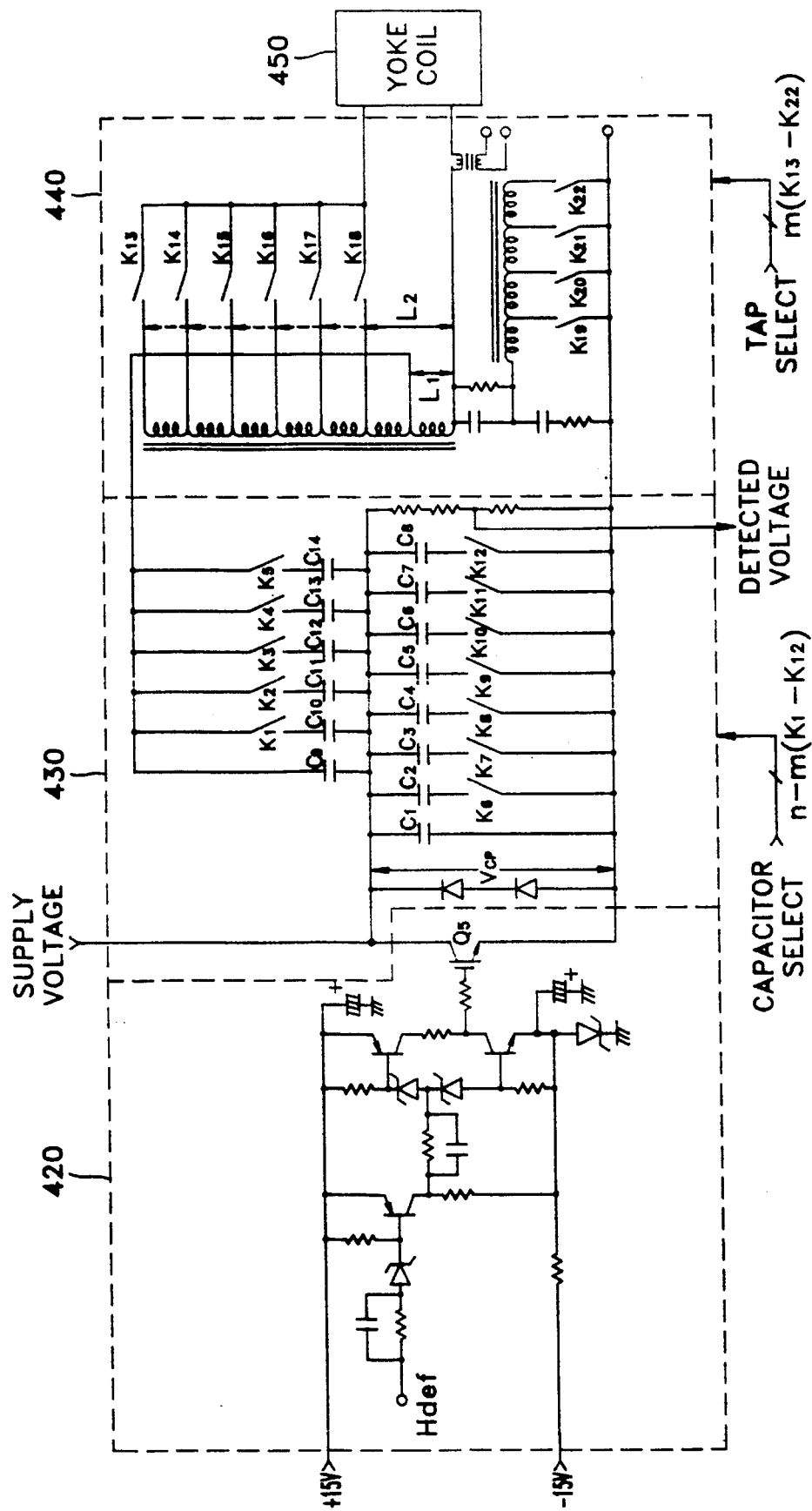
FIG. 6 is a circuit diagram of the deflection coil driver and capacitor controller and autotransformer of FIG. 4.

Referring now to FIGS. 4–6, a horizontal deflection amplifying apparatus according to the present invention is comprised of a power supply 410 for supplying constant (DC) voltages and which includes a protective circuit 410a (see FIG. 5) a deflection coil driver 420, a capacitor controller 430 having a plurality of capacitors $C_1$–$C_{14}$ for supplying the appropriate voltage to a yoke coil 450, shown in FIG. 6, an autotransformer 440, and a microprocessor 460 for controlling the protective circuit and for selectively connecting the capacitors. The deflection coil driver 420 and capacitor controller 430 are the same as those shown in FIG. 1, while the power supply 410 differs from the one shown in FIG. 2 only by the inclusion of the protection circuit 410a.

The power supply 410 as shown in FIG. 5, includes the protective circuit 410a which has, a transistor $Q_6$ connected in parallel with the SCR $Q_3$. Just before the capacitors are connected to or disconnected from the yoke coil 450 via autotransformer 440, the transistor $Q_6$ is turned on, grounding the base of the transistor $Q_2$ and thus interrupting the supply voltage, to thereby protect the IGBT $Q_5$ of the deflection coil driver 420.

The microprocessor 460 controls the relay switches $K_1$–$K_{12}$ (first switching means) of the capacitor controller 430, the relay switches $K_{13}$–$K_{22}$ of the autotransformer 440, and the on-and off-operation of the transistor $Q_6$ of the protective circuit 410a.

The operation of the horizontal deflection amplifying apparatus as described above will now be explained. When the supply voltage of the power supply 410 is low, the voltage applied to a primary winding $L_1$ is 80 V, and when the supply voltage is high, the $L_1$ voltage is 0 V.

The proper combination of relay switches $K_1$–$K_{12}$ is determined which controls (turn on) the capacitors $C_1$–$C_{14}$ (wherein $C_1$ and $C_9$ are basically selected) in order to supply the desired deflection current for the yoke coil 450. The microprocessor 460 controls the n relay switches $K_1$–$K_{22}$ which are comprised of the m switches $K_{13}$–$K_{22}$ for the selective connection of the intermediate taps for determining the secondary winding inductance of the autotransformer 440, and the n-m switches $K_1$–$K_{12}$ for selectively connecting the capacitor bank of the capacitor controller 430. The n relay switches are connected to the microprocessor 460 by n bus lines and are controlled according to a tap selection signal of the microprocessor 460. Also, under the control of the microprocessor 460, the protective circuit 410a interrupts the supply voltage of the power supply 410 immediately before any of the relay switches are operated, namely, right before the connection state of the yoke coil and capacitors changes, to thereby protect the transistor $Q_5$ (IGBT) and the yoke coil 450 from excess current spiking.

In the protective circuit 410a, when a control signal from the microprocessor 460 is applied to the base of the transistor $Q_6$, the base voltage of the driver transistor $Q_2$ of the power supply 410 drops to 0 V which thereby interrupts the supply voltage applied to the circuits show in FIG. 6.

The autotransformer 440 includes a plurality of taps, relay switches $K_{13}$–$K_{18}$ which select the appropriate taps in order to generate a deflection voltage appropriate for the horizontal deflection coil of the television set, and relay switches $K_{19}$–$K_{22}$ which correspond to the fine-control taps for "fine-tuning" the deflection voltage. These relay switches are automatically selected and connected by the microprocessor 460 with a predetermined control program. For the driver device ($Q_5$) of the deflection coil driver 420, an active device such as a bipolar transistor, IGBT, FET, SCR or triac can be used and the characteristics of the IGBT are the most preferable.

Figure 8:
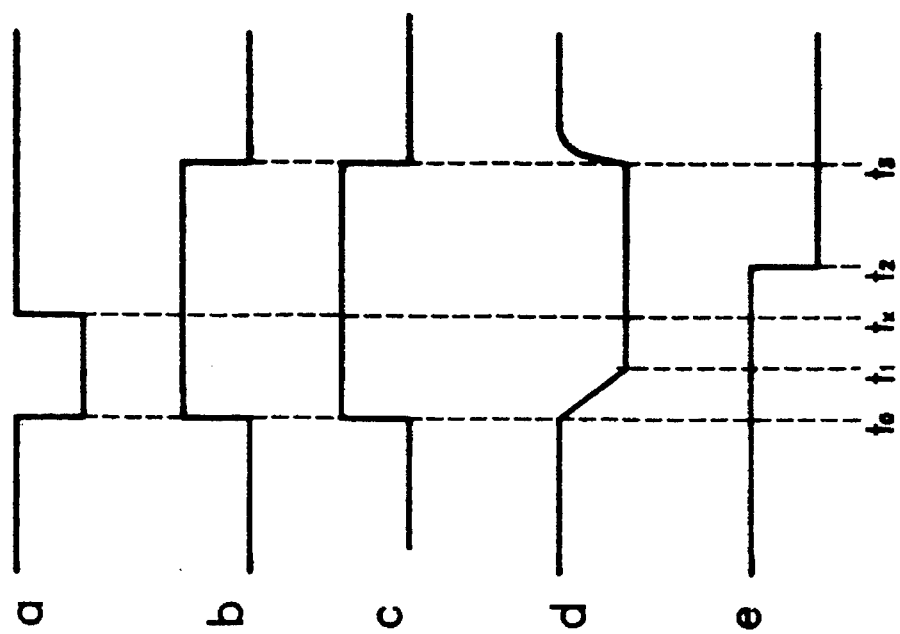
FIGS. 7 and 8 are timing diagrams showing the circuit operation when capacitors are connected to and separated from the deflection coil of FIG. 4, respectively.
Figure 7:
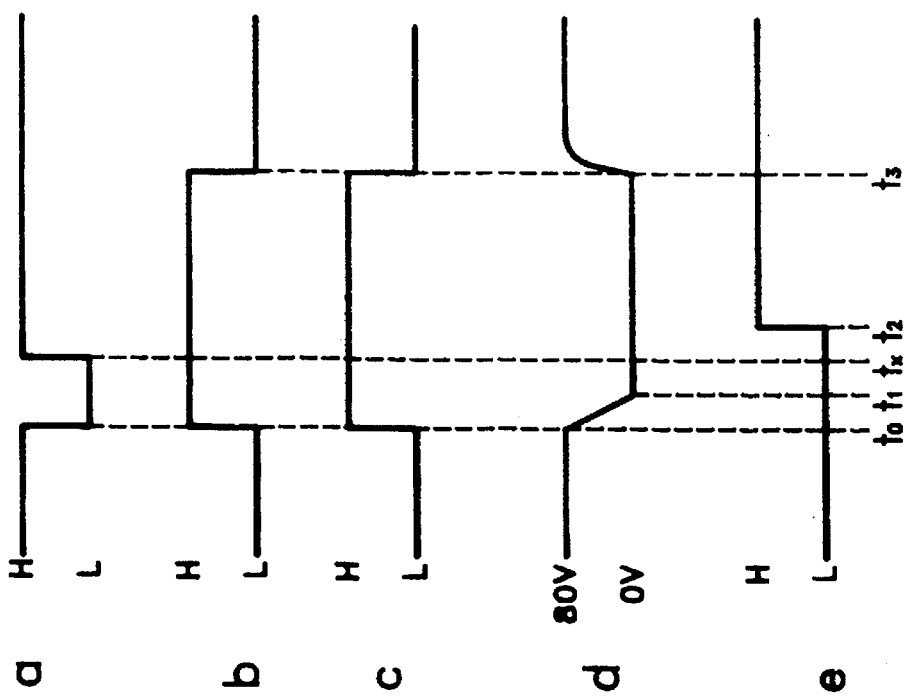

Each set of waveforms a–e of FIGS. 7 and 8 represent the voltages present at the five nodes of the circuits shown in FIGS. 5 and 6, for the relay-on and relay-off modes, respectively. That is, "a" shows a switching signal indicating, respectively, connection and separation of a capacitor; "b" shows the base voltage of the transistor $Q_6$; "c" shows the base voltage of the transistor $Q_4$; "d" shows the primary winding voltage $L_1$ of the autotransformer 440 for generating driving voltage applied to the yoke coil, which is determined by the collector voltage of the IGBT drive transistor $Q_5$; and "e" shows the voltage across a relay switch. The operational sequence of the microprocessor 460, for protecting the horizontal deflection amplifying apparatus of the present invention, will be described with reference to waveforms a–e.

When the capacitors in the capacitor controller 430 are to be connected to (or disconnected from) the yoke coil 450, the switching signals for operating the relay switches $K_1$–$K_{12}$ to appropriately select and connect (or disconnect) corresponding capacitors in the capacitor controller 430 and the relay switches $K_{13}$–$K_{18}$ to selectively connect the taps of the autotransformer 440 are generated by the microprocessor 460 for a time period $t_0$~$t_x$ (see "a" in FIGS. 7 and 8), where $t_x$ represents an arbitrary time. The microprocessor 460 then applies a "high" control signal (see "b" and "c" following "b" in FIGS. 7 and 8) to the base of the transistor $Q_6$ of the protective circuit 410a, to drop the drive voltage of the $L_1$ winding to 0 V (see "d" in FIGS. 7 and 8). Here, the time period for bringing the yoke coil's drive voltage down to 0 V is $t_0$~$t_1$ (approximately 2 ms).

The high (or low) signal for selectively connecting (or disconnecting) the relay switches $K_1$–$K_{18}$ of the capacitor controller 430 and the autotransformer 440 at time $t_2$ is applied to the relay switches $K_{13}$–$K_{18}$ by the microprocessor 460 to turn on or off the relay switch. The on/off operation of the relay switch should be performed while the drive voltage of the primary winding $L_1$ is 0 V. Accordingly, at $t_3$ when the corresponding capacitor and the yoke coil 450 are connected or disconnected a "low" control signal of the microprocessor 460 is applied to the base of the transistor $Q_6$ of the protective circuit 410a of FIG. 5. Thus, the supply voltage from the power supply 410 is supplied again and then the drive voltage of the primary winding $L_1$ returns to 80 V. That is, the supply voltage of about 80 V is supplied to the capacitor controller 430, to supply 80 V to the primary winding $L_1$ of the autotransformer 440 and to apply the necessary voltage for the yoke coil 450, according to a secondary winding $L_2$ selected by one of the relay switches $K_{13}$–$K_{18}$, so that the proper current flows through the yoke coil 450 via the capacitors. The response time period ($t_0$~$t_2$) of the relay switches is approximately 100 ms and $t_1$–$t_{13}$ is the valid interrupt time period, in the total supply voltage interrupt time period ($t_0$~$t_3$).

When the collector voltage of IGBT $Q_5$ arrives at the normal voltage of the power supply 410 too fast, a sharp change of the voltage in this transient state may generate a voltage of 1300 V or higher at the collector of transistor $Q_5$ of the deflection coil driver 420 due to the inductance of the yoke coil 450 and the autotransformer 440. Accordingly, a soft starting device is required and, to realize this soft starting, a resistance $R_4$ and a capacitor $C_{15}$ are connected to the base of the transistor $Q_4$ of the power supply 410.

Figure 9:
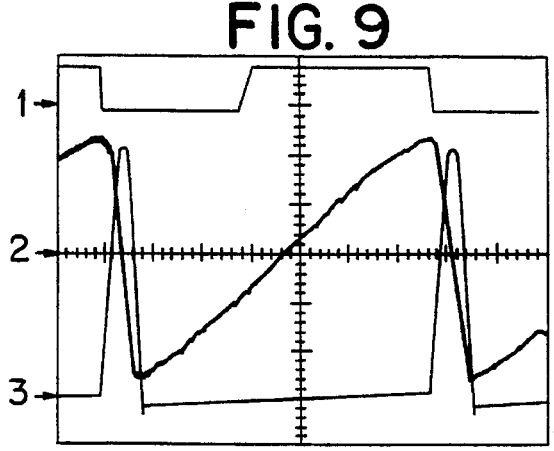
FIG. 9 shows waveforms for explaining the operation of the circuit of FIG. 4.
Figure 10:
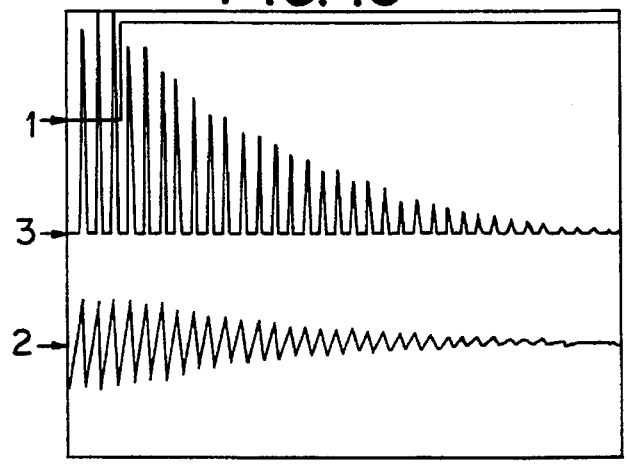
FIGS. 10 and 11 show time-expanded waveforms of FIG. 9, when the power supply of FIG. 4 is in an off-mode and an on-mode, respectively.
Figure 11:
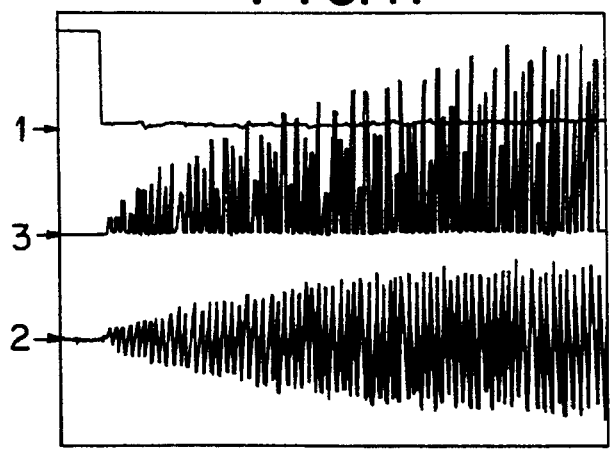

The operation of the horizontal deflection amplifying apparatus is represented in FIGS. 9–11, in which a waveform 1 is the gate voltage of the IGBT ($Q_5$), a waveform 2 is the current flowing in the yoke coil, and a waveform 3 is the IGBT collector voltage. The IGBT is damaged when its collector voltage exceeds 1300 V. FIGS. 10 and 11 show time-expanded waveforms of FIG. 9, when the power supply of FIG. 4 is in an off-mode and an on-mode, respectively.

As described above, according to the horizontal deflection amplifying apparatus of the present invention, the connection of the yoke coil and capacitors is changed into a relay switching operation by the control of a microprocessor. To prevent the drive transistor of the deflection coil driver from being destroyed or the yoke coil from being damaged due to excess current generated when the capacitor is connected to or disconnected from a circuit during operation of the deflection coil by the applied power supply, the capacitor is connected or disconnected the power supply voltage is 0 V and then the power supply voltage is applied again. Thus, the horizontal deflection amplifying apparatus can be safely driven.

What is claimed is:

1. A horizontal deflection amplifying apparatus comprising:

an autotransformer having a plurality of taps;

a plurality of capacitors selectively connectable to the taps of the autotransformer;

first switching means for selectively connecting the capacitors to and disconnecting capacitors from the taps of the autotransformer;

a deflection coil driver for applying current to the autotransformer through the first switching means;

a power supply for supplying a constant voltage to the capacitors and the deflection coil driver, the power supply including protective means for interrupting the constant voltage to protect the deflection coil driver; and control means for controlling the first switching means and for supplying a control signal to the protective means to temporarily interrupt the constant voltage before connecting and disconnecting operations of the first switching means.

2. The horizontal deflection amplifying apparatus according to claim 1, wherein the first switching means comprises first relay switches for selecting the capacitors and second relay switches for selecting the taps of the autotransformer.

3. The horizontal deflection amplifying apparatus according to claim 1, wherein the protective means of the power supply comprises second switching means for disabling the power supply in response to the control signal of the control means.

4. The horizontal deflection amplifying apparatus according to claim 3, wherein the second switching means is comprised of one selected from the group consisting of a bipolar transistor, IGBT, FET, SCR and triac.

* * * * *